J. I. RAY.
FIFTH WHEEL.
APPLICATION FILED NOV. 26, 1907.
915,478.  Patented Mar. 16, 1909.
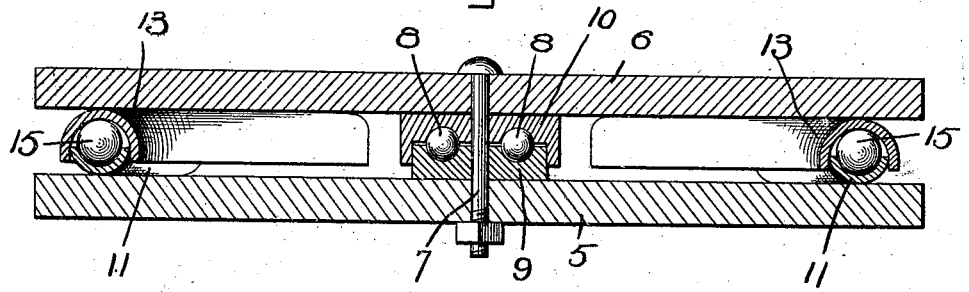
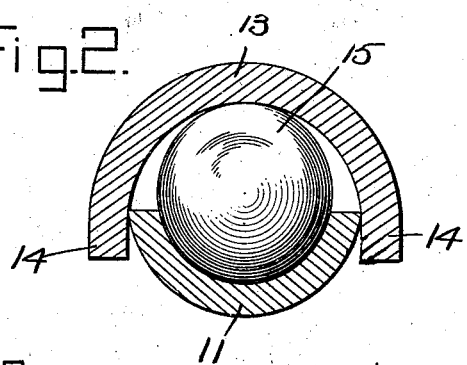
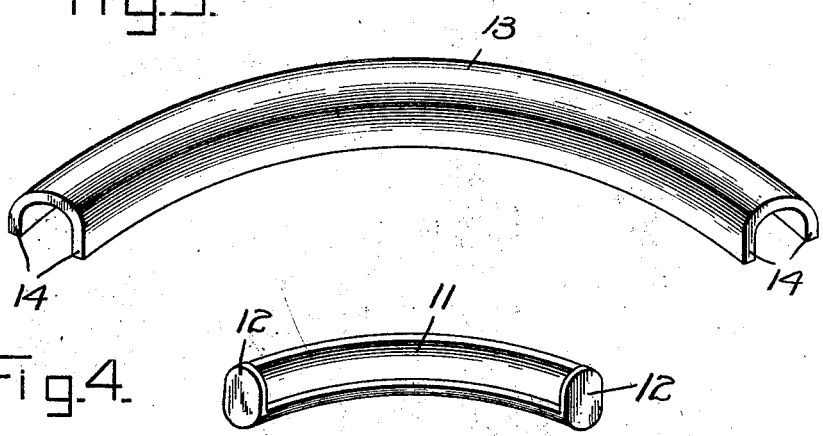
Witnesses
J. C. Miller
John Powers
Inventor
James I. Ray
By Chandlee & Chandlee
Attorneys

UNITED STATES PATENT OFFICE.

JAMES I. RAY, OF BLUFFTON, GEORGIA.

FIFTH-WHEEL.

No. 915,478.     Specification of Letters Patent.     Patented March 16, 1909.

Application filed November 26, 1907. Serial No. 403,884.

*To all whom it may concern:*

Be it known that I, JAMES I. RAY, a citizen of the United States, residing at Bluffton, in the county of Clay, State of Georgia, have invented certain new and useful Improvements in Fifth-Wheels; and I do hereby declare the following to be a full, clear, and exact description of the invention, such as will enable others skilled in the art to which it appertains to make and use the same.

This invention relates to new and useful improvements in fifth wheels for vehicles, and it has more particular reference to ball bearing fifth wheels.

The invention aims as a primary object to provide a fifth wheel in which curved coöperating upper and lower members are employed, which members are of novel construction and arrangement toward protecting the inclosed ball bearings from dust and toward preventing the same from becoming exposed during the turning of the vehicle.

The details of construction will appear in the course of the following description, in which reference is had to the accompanying drawings, forming a part of this specification, like characters of reference designating similar parts, throughout the several views, wherein:—

Figure 1 is a longitudinal sectional view showing the construction and manner of mounting the present fifth wheel. Fig. 2 is an enlarged detailed cross sectional view through two of the coöperating curved members above referred to. Fig. 3 is a detailed perspective view of one of the members carried by the truck beam, the other member being a duplicate thereof. Fig. 4 is a detailed perspective view of one of the members carried by the bolster, the other bolster member being a duplicate thereof.

In the accompanying drawings, the numeral 5 designates the truck beam and the numeral 6 the bolster, the parts 5 and 6 being connected by the king bolt 7 and being spaced by ball bearings 8 mounted in annular race pieces 9 and 10, provided upon the adjacent faces of said truck beam and bolster. At the ends of the truck beam, members 11 each curved in the arc of a circle are mounted. The members 11 are coextensive and the direction of their curvature is opposed. Said members are of U shape in cross section and are closed at their ends by integral walls 12.

At the ends of the bolster 6, members 13 are mounted. The members 13 are curved in the arc of a circle to the same degree as the members 11 and have the same relative arrangement as the members 11, but the members 13 are of greater length than said members 11, over which they fit and with relation to which they are axially movable. The depending sides 14 of the members 13 lie in contact with the sides of the members 11 and together with the end walls 12 form a seal to prevent dust from working into the inclosure afforded by said members 13 and 11 in their superposed relation, in which inclosure, the ball bearings 15 are disposed, it being understood that the cross sectional curvature of the members 11 and 13 is such that they conjointly form race ways for the ball bearings 15.

Owing to the fact that the members 13 are of greater length than the members 11, it will be apparent that when the front truck is turned about the king bolt 7 as a pivotal center, the members 13, will always keep the members 11 closed against the entrance of dust thereinto and prevent the ball bearings from being exposed.

The invention is simple in its structural details, inexpensive to manufacture and practical and efficient in use.

What is claimed is:

In a fifth wheel of the class described the combination with a truck beam and a bolster, of a king bolt connection therebetween, coextensive curved lower members of substantially U-shape in cross section and mounted at the ends of said truck beam and at directly opposite points with respect to each other, said members being curved to the same degree and in relatively opposite directions, upwardly projecting closed end walls at opposite ends of each lower member, superposed inverted U-shaped upper members at the ends of said bolster, said upper members being similarly curved and arranged to said lower members but being of a greater length than the latter, said superposed upper members having depending side portions adapted to overlie the sides of said lower members and in contact with the latter and also being open at their free ends, and ball bearings confined between said members, said closed end walls of the lower members fitting snugly into the superposed members to form dust-proof closures for the lower and superposed members during the rotary movement of the lower members throughout the entire length of the upper members.

In testimony whereof, I affix my signature, in presence of two witnesses.

JAMES I. RAY.

Witnesses:
  E. S. JONES,
  J. H. MANSFIELD.